United States Patent
Saucier et al.

(10) Patent No.: US 9,943,454 B2
(45) Date of Patent: Apr. 17, 2018

(54) INSTALLATION METHOD AND ARRANGEMENT FOR A WHEELCHAIR LIFT ARRANGEMENT

(71) Applicant: RICON CORP., Panorama City, CA (US)

(72) Inventors: Stanton D. Saucier, Tarzana, CA (US); Dante V. DeLeo, Santa Clarita, CA (US)

(73) Assignee: Ricon Corp., San Fernando, CA (US)

( * ) Notice: Subject to any disclaimer, the term of this patent is extended or adjusted under 35 U.S.C. 154(b) by 126 days.

(21) Appl. No.: 14/384,830

(22) PCT Filed: Mar. 14, 2013

(86) PCT No.: PCT/US2013/031691
§ 371 (c)(1),
(2) Date: Sep. 12, 2014

(87) PCT Pub. No.: WO2013/142280
PCT Pub. Date: Sep. 26, 2013

(65) Prior Publication Data
US 2015/0044006 A1  Feb. 12, 2015

Related U.S. Application Data

(60) Provisional application No. 61/612,642, filed on Mar. 19, 2012.

(51) Int. Cl.
*A61G 3/06* (2006.01)
*B62D 65/02* (2006.01)

(52) U.S. Cl.
CPC ............. *A61G 3/062* (2013.01); *B62D 65/02* (2013.01); *Y10T 29/49826* (2015.01)

(58) Field of Classification Search
CPC ................................. A61G 3/062; B62D 65/02
USPC ................................ 52/579, 745.05; 414/539
See application file for complete search history.

(56) References Cited

U.S. PATENT DOCUMENTS

| | | | | |
|---|---|---|---|---|
| 4,084,713 A | * | 4/1978 | Rohrs | A61G 3/061 14/69.5 |
| 4,121,695 A | * | 10/1978 | Carpenter | A61G 3/062 414/539 |
| 4,127,200 A | * | 11/1978 | Mann | A61G 3/0209 212/180 |

(Continued)

FOREIGN PATENT DOCUMENTS

| | | |
|---|---|---|
| JP | 2003199793 A | 7/2003 |
| JP | 2008114013 A | 5/2008 |

(Continued)

*Primary Examiner* — Charles A Fox
*Assistant Examiner* — Joseph J. Sadlon
(74) *Attorney, Agent, or Firm* — The Webb Law Firm

(57) ABSTRACT

A wheelchair lift arrangement configured to be installed in a preexisting structure includes a lift base assembly including a lift base plate and two supports attached to the lift base plate; and at least one installation bracket connected to each of the supports, respectively. Each installation bracket includes a horizontal portion and a vertical portion. The horizontal portion and the vertical portion of each installation bracket are each configured to connect the respective installation bracket and the lift base assembly to the preexisting structure at a separate location.

17 Claims, 8 Drawing Sheets

(56) References Cited

U.S. PATENT DOCUMENTS

| | | | | |
|---|---|---|---|---|
| 4,158,524 A * | 6/1979 | Serafin | ............. | A61G 3/063 187/200 |
| 4,170,368 A * | 10/1979 | Southward | ............. | A61G 5/00 280/250.1 |
| 4,376,611 A * | 3/1983 | Koop | ............. | A61G 3/0209 224/310 |
| 4,447,031 A * | 5/1984 | Souder, Jr. | ............. | F16M 11/126 248/281.11 |
| 4,457,663 A * | 7/1984 | Hems | ............. | A61G 3/06 280/304.1 |
| 4,551,060 A * | 11/1985 | Quercy | ............. | B60N 2/245 187/200 |
| 4,991,810 A * | 2/1991 | Andrus | ............. | A61G 3/06 248/286.1 |
| 5,024,420 A * | 6/1991 | Downing | ............. | E04B 1/34336 256/67 |
| 5,026,244 A * | 6/1991 | Dorn | ............. | A61G 3/02 414/540 |
| 5,040,936 A * | 8/1991 | Rhea | ............. | A61G 3/06 187/901 |
| 5,180,275 A * | 1/1993 | Czech | ............. | A61G 3/06 187/200 |
| 5,199,842 A * | 4/1993 | Watt | ............. | A61G 3/0209 224/497 |
| 5,234,311 A * | 8/1993 | Loduha, Jr. | ............. | A61G 3/06 414/546 |
| 5,308,214 A * | 5/1994 | Crain | ............. | A61G 3/0209 414/541 |
| 5,393,192 A * | 2/1995 | Hall | ............. | A61G 3/061 14/69.5 |
| 5,746,465 A * | 5/1998 | Jones | ............. | B60N 2/14 296/65.03 |
| 5,791,857 A * | 8/1998 | Ziaylek, Jr. | ............. | E06C 5/04 182/127 |
| 6,065,924 A * | 5/2000 | Budd | ............. | A61G 3/06 414/546 |
| 6,077,025 A * | 6/2000 | Budd | ............. | A61G 3/06 414/546 |
| 6,517,048 B2 * | 2/2003 | Ettinger | ............. | F16K 3/188 251/167 |
| 7,325,389 B2 * | 2/2008 | Walker | ............. | A01D 43/0635 298/11 |
| 7,594,556 B1 * | 9/2009 | Panzarella | ............. | A61G 3/0209 180/167 |
| 8,540,474 B2 * | 9/2013 | Egan | ............. | A61G 7/1001 212/230 |
| 8,844,738 B2 * | 9/2014 | Thompson | ............. | B66C 23/44 212/180 |
| 9,139,122 B2 * | 9/2015 | Esparza | ............. | B60P 1/5433 |
| 2004/0146368 A1 * | 7/2004 | Konishi | ............. | B23Q 1/0009 409/131 |
| 2005/0186056 A1 * | 8/2005 | Logan | ............. | B60P 1/4442 414/540 |
| 2007/0059136 A1 * | 3/2007 | Schlangen | ............. | B60P 1/4421 414/467 |
| 2007/0122260 A1 * | 5/2007 | Zablocky | ............. | A61G 3/0209 414/543 |

FOREIGN PATENT DOCUMENTS

| | | | | |
|---|---|---|---|---|
| WO | | 2011021471 A1 | 2/2011 | |
| WO | WO | 2011021471 A1 * | 2/2011 | ............. A61G 3/08 |

* cited by examiner

INSTALLATION METHOD AND ARRANGEMENT FOR A WHEELCHAIR LIFT ARRANGEMENT

CROSS REFERENCE TO RELATED APPLICATION

This application is the United States national phase of International Application No. PCT/US2013/031691 filed Mar. 14, 2013, and claims priority from U.S. Provisional Patent Application No. 60/612,642, filed on Mar. 19, 2012, the disclosures of which are incorporated herein by reference in their entirety.

BACKGROUND OF THE INVENTION

Field of the Invention

The present invention relates generally to access systems and wheelchair lift arrangements, for example wheelchair lift arrangements for use in connection with a vehicle, and, in particular, to a method of and arrangement for installing a wheelchair lift arrangement in a vehicle, such as a dual parallel-arm, platform-type wheelchair lift arrangement.

Description of Related Art

As is known in the art, access systems and wheelchair lift arrangements are provided to permit access, entry, exit, ingress, egress, and the like from a variety of structures and environments. For example, many vehicles are fitted or configured to interact with a wheelchair lift arrangement to allow a wheelchair (or other limited mobility) user to enter and exit the vehicle. One known type of wheelchair lift arrangement is in the form of a dual parallel-arm, platform-type wheelchair lift.

Since their introduction in the early 1980s, most dual parallel-arm, platform-type wheelchair lifts have been installed in vehicles using a series of bolts and supporting hardware to firmly attach the lift's base plate directly to the vehicle floor structure. Though the relative proximity of the bolts used to attach the lift to the vehicle has made for a spatially-efficient installation, it has also necessarily meant that the load in each fastener is relatively high. As can be seen in FIG. 1, the reactions at locations A and B at the base plate and/or mounting brackets (which are attached to the floor of the vehicle) are on the order of 3 to 4 times the magnitude of the load on the platform of the wheelchair lift arrangement.

As the types of vehicles in which wheelchair (or access) lifts are typically installed have become lighter, the vehicular structure available to which the wheelchair lift arrangement can be anchored has also become lighter, necessitating the use of supplemental reinforcement. As seen in FIG. 2, this supplemental reinforcement may include a sub-frame member configured for engagement with a clamping bar positioned underneath the vehicle floor. One or more of these sub-frame members can be used to support the clamping bar and provide structural reinforcement. However, as expected, the use of supplemental reinforcement leads to a variety of drawbacks and deficiencies, including, but not limited to, (1) additional material and/or installation costs; (2) additional weight, which leads to (i) greater fuel consumption; (ii) additional load on the vehicle's braking system; and (iii) less available payload; and (3) additional structural components, which means more material and labor are required to effect the installation. Further, with the aging of the population, the need for cost-effective care solutions has increased and will continue to increase.

Existing systems may include brackets that attach to the vehicle wall or door frame. However, such systems and arrangements are redundant since the wheelchair lift arrangement must still be bolted to the vehicle floor. Also, such systems and arrangements may lower the load at the attachment point, but the need for more efficient load distribution is required, especially for lighter vehicles (which is the current industry trend).

SUMMARY OF THE INVENTION

Accordingly, there exists a need in the art to provide an improved installation method and arrangement for a wheelchair lift arrangement, particularly installation on or in a vehicle.

Generally, provided are an installation method and arrangement for a wheelchair lift arrangement that address and/or overcome some or all of the drawbacks and deficiencies that exist in current access systems and/or wheelchair lift arrangements. Preferably, provided are an installation method and arrangement for a wheelchair lift arrangement that are useful in connection with vehicle-based wheelchair lift arrangements. Preferably, provided are an installation method and arrangement for a wheelchair lift arrangement that provide appropriate structural integrity to the wheelchair lift arrangement. Preferably, provided are an installation method and arrangement for a wheelchair lift arrangement that do not lead to high installation/labor and/or material costs. Preferably, provided are an installation method and arrangement for a wheelchair lift arrangement that do not give rise to unnecessary weight limitations.

Therefore, in one preferred and non-limiting embodiment, provided are an installation method and arrangement for a wheelchair lift arrangement that are modular in nature, and which can be installed either without vehicle modifications or very minimal vehicle modifications. Furthermore, in another preferred and non-limiting embodiment, provided are an installation method and arrangement for a wheelchair lift arrangement that require less installation time and incur less costs than presently-available methods and arrangements. In one preferred and non-limiting embodiment, provided is an installation arrangement for a wheelchair lift arrangement, including at least one bracket arrangement for attachment between at least a portion of the wheelchair lift arrangement and at least a surface or arrangement of another structure, such as a vehicle.

In accordance with one embodiment of the present invention, a wheelchair lift arrangement configured to be installed in a preexisting structure is provided. The wheelchair lift arrangement includes a lift base assembly including a lift base plate and at least two supports attached to the lift base plate; and at least one installation bracket connected to at least one of the supports, wherein the at least one installation bracket includes at least one of a horizontal portion and a vertical portion configured to connect the at least one installation bracket and the lift base assembly to the preexisting structure at a specified location.

In accordance with another embodiment of the present invention, a vehicle and wheelchair lift arrangement is provided. The vehicle includes a vehicle floor and a plurality of preexisting anchorage points. The wheelchair lift arrangement includes a lift base assembly including a lift base plate and at least two supports attached to the lift base plate, the lift base plate being connected to the vehicle floor; and at least one installation bracket connected to at least one of the supports, wherein the at least one installation bracket includes at least one of a horizontal portion and a vertical portion. The at least one of a horizontal portion and a vertical portion is configured to connect the at least one installation bracket and the lift base assembly to the at least one preexisting anchorage point of the vehicle.

In accordance with yet another embodiment of the present invention, a method of installing a wheelchair lift arrangement in a vehicle is provided. The vehicle includes a vehicle floor and a plurality of preexisting anchorage points. The method includes: providing a lift base assembly including a lift base plate and at least two supports attached to the lift base plate; providing at least one installation bracket connected to at least one of the supports, wherein the at least one installation bracket includes at least one of a horizontal portion and a vertical portion having a connection arrangement disposed at an end thereof; connecting the lift base plate to the vehicle floor; and connecting the connecting arrangement to the at least one preexisting anchorage point.

These and other features and characteristics of the present invention, as well as the methods of operation and functions of the related elements of structures and the combination of parts and economies of manufacture, will become more apparent upon consideration of the following description and with reference to the accompanying drawings, all of which form a part of this specification, wherein like reference numerals designate corresponding parts in the various figures. It is to be expressly understood, however, that the drawings are for the purpose of illustration and description only, and are not intended as a definition of the limits of the invention. As used in the specification and the claims, the singular form of "a", "an", and "the" include plural referents unless the context clearly dictates otherwise.

DETAILED DESCRIPTION OF THE PREFERRED EMBODIMENTS

Figure 1:
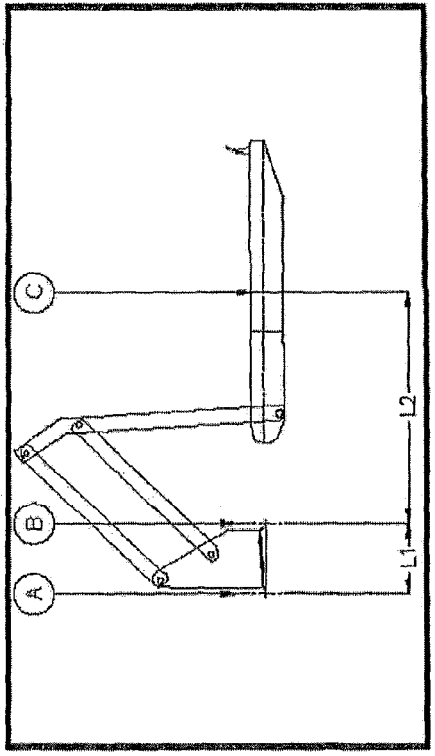
FIG. 1 depicts a schematic view and chart of a wheelchair lift arrangement and vehicle floor requirements according to the prior art.
Figure 2:
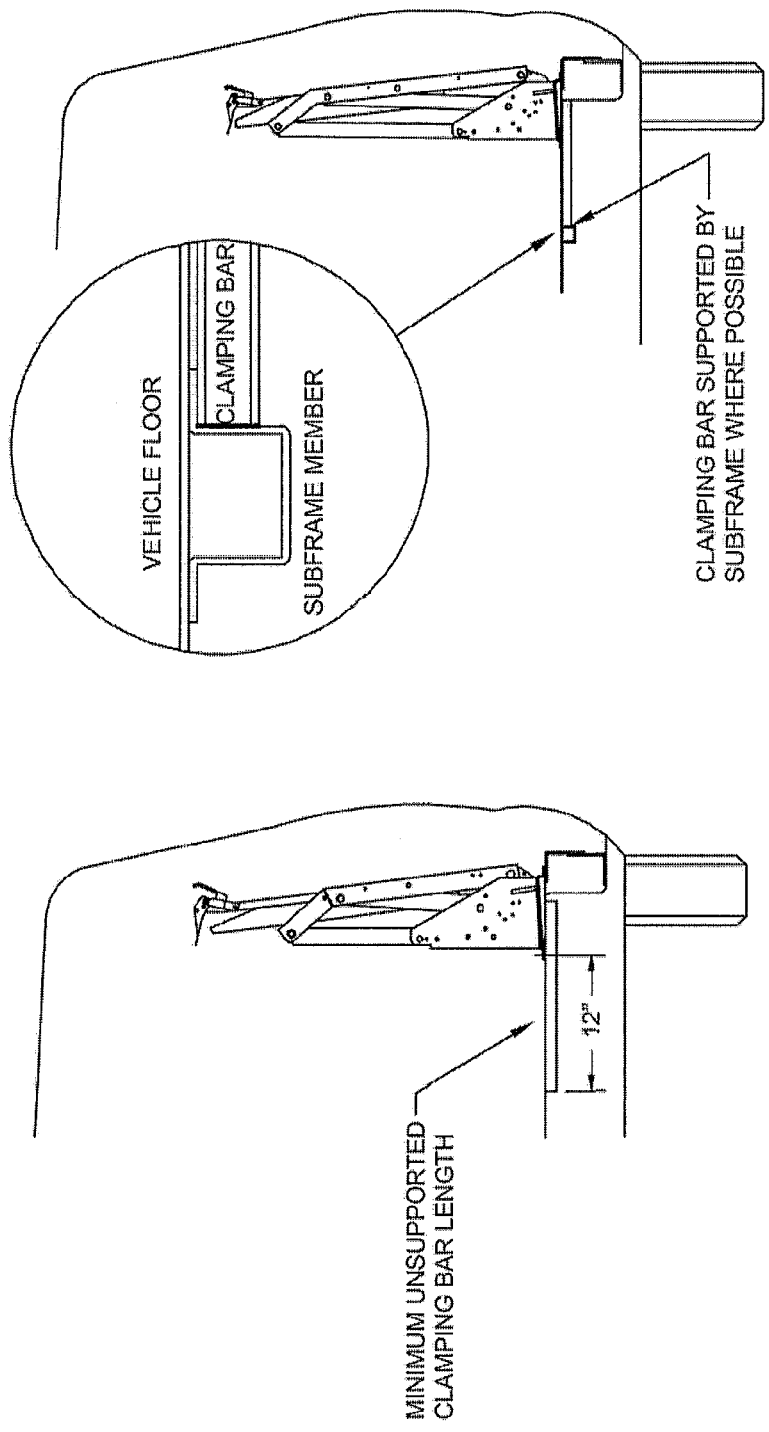
FIG. 2 depicts a schematic view of existing supplemental support arrangements for a wheelchair lift arrangement according to the prior art.

For purposes of the description hereinafter, the terms "end", "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

Figure 3:
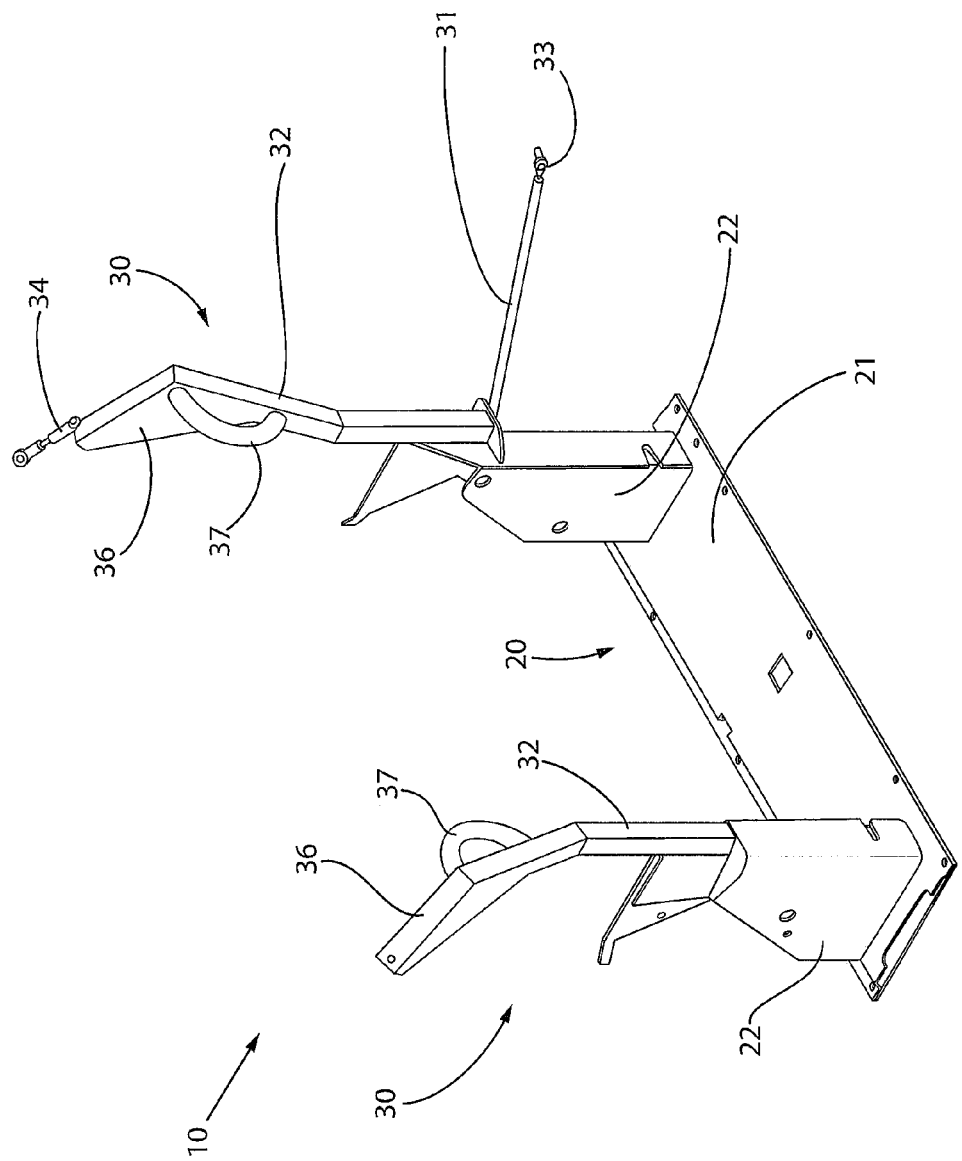
FIG. 3 depicts a perspective view of a wheelchair lift arrangement in accordance with an embodiment of the present invention.
Figure 4:
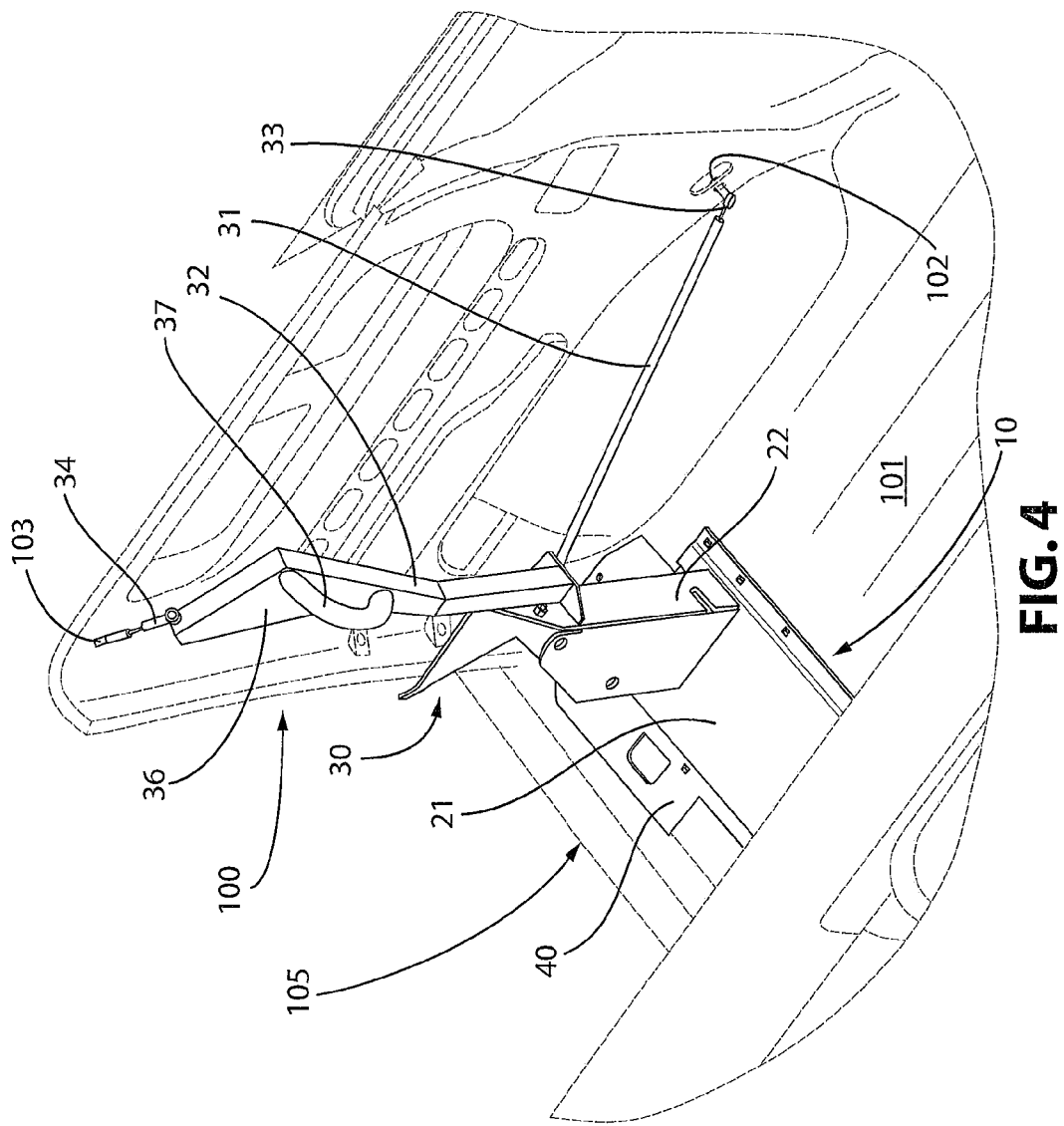
FIG. 4 depicts a further perspective view of the wheelchair lift arrangement of FIG. 3 installed in a vehicle.
Figure 5:
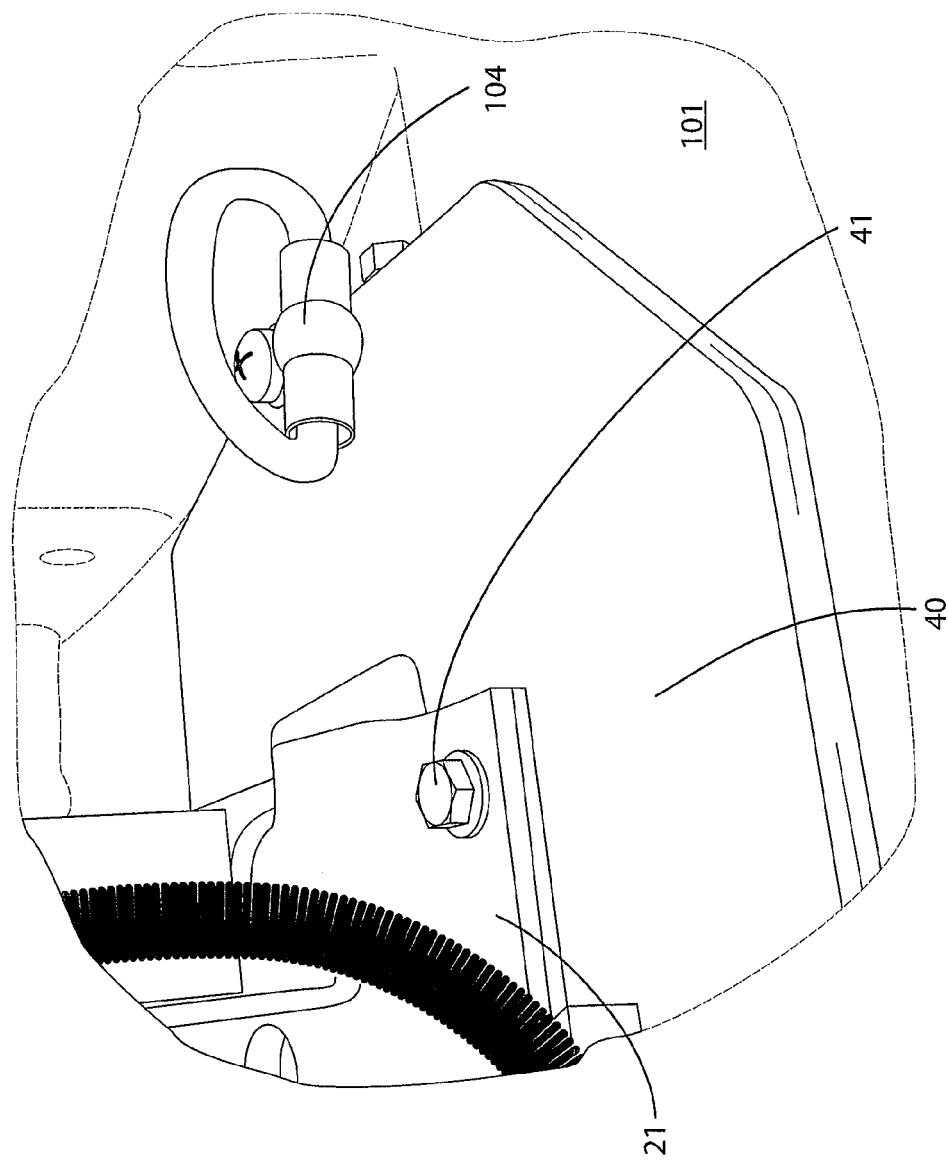
FIG. 5 depicts a perspective view of a portion of the wheelchair lift arrangement of FIG. 3 connected to a vehicle floor.
Figure 6:
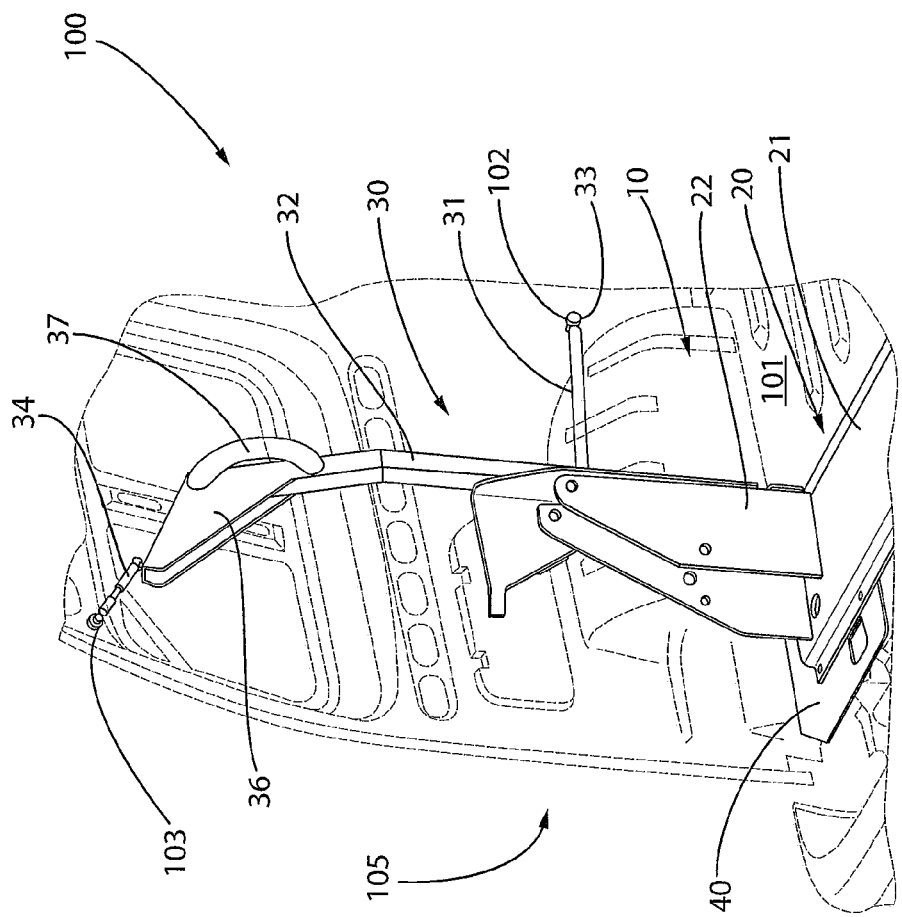
FIG. 6 depicts another perspective view of the wheelchair lift arrangement installed in the vehicle.

With reference to FIGS. 3-6, a wheelchair lift arrangement 10 is shown in accordance with one preferred and non-limiting embodiment of the present invention. The wheelchair lift arrangement 10 is configured to be installed in a preexisting structure. In particular, the wheelchair lift arrangement 10 is configured to be installed in a vehicle 100, such as a bus or van. In one particular embodiment of the invention, the wheelchair lift arrangement 10 is mounted in the vehicle 100 proximate to a rear entry 105 of the vehicle 100, as shown in FIGS. 4 and 6. While the installation method and arrangement of the present invention is shown in use in connection with a wheelchair lift arrangement 10, the installation and arrangement hereinafter described can be used in connection with any suitable access arrangement or system. Further, while the installation method and arrangement of the present invention is shown in use in connection with a vehicle 100, the installation method and arrangement hereinafter described can also be used in connection with mounting an access system and/or wheelchair lift arrangement 10 in a variety of applications and environments.

As shown in FIGS. 3-6, the wheelchair lift arrangement 10 includes a lift base assembly 20 having a lift base plate 21 and at least two supports 22, which are preferably vertically-extending supports, attached to the lift base plate 21 and extending upwardly therefrom. The lift base plate 21 is connected to a support surface of the preexisting structure, such as a floor 101 of the vehicle 100. The vertically-extending supports 22 may include one or more plates acting as mounting brackets suitable for mounting and supporting a dual parallel-arm lift mechanism, as discussed above with reference to FIG. 1. The wheelchair lift arrangement 10 further includes at least one installation bracket 30 connected to at least one of the vertically-extending supports 22, which acts as a supplemental or separate structure for attaching the lift base assembly 20 to the preexisting structure. According to one embodiment of the present invention, at least one installation bracket 30 is connected to each vertically-extending support 22. The at least one installation bracket 30 includes at least one of a horizontal portion 31 and a vertical portion 32 and may include both, as shown in FIGS. 3, 4, and 6. The horizontal portion 31 and the vertical portion 32 of the at least one installation bracket 30 are configured to connect the respective installation bracket 30 and the lift base assembly 20 to the preexisting structure at a separate specified location.

Figure 7:
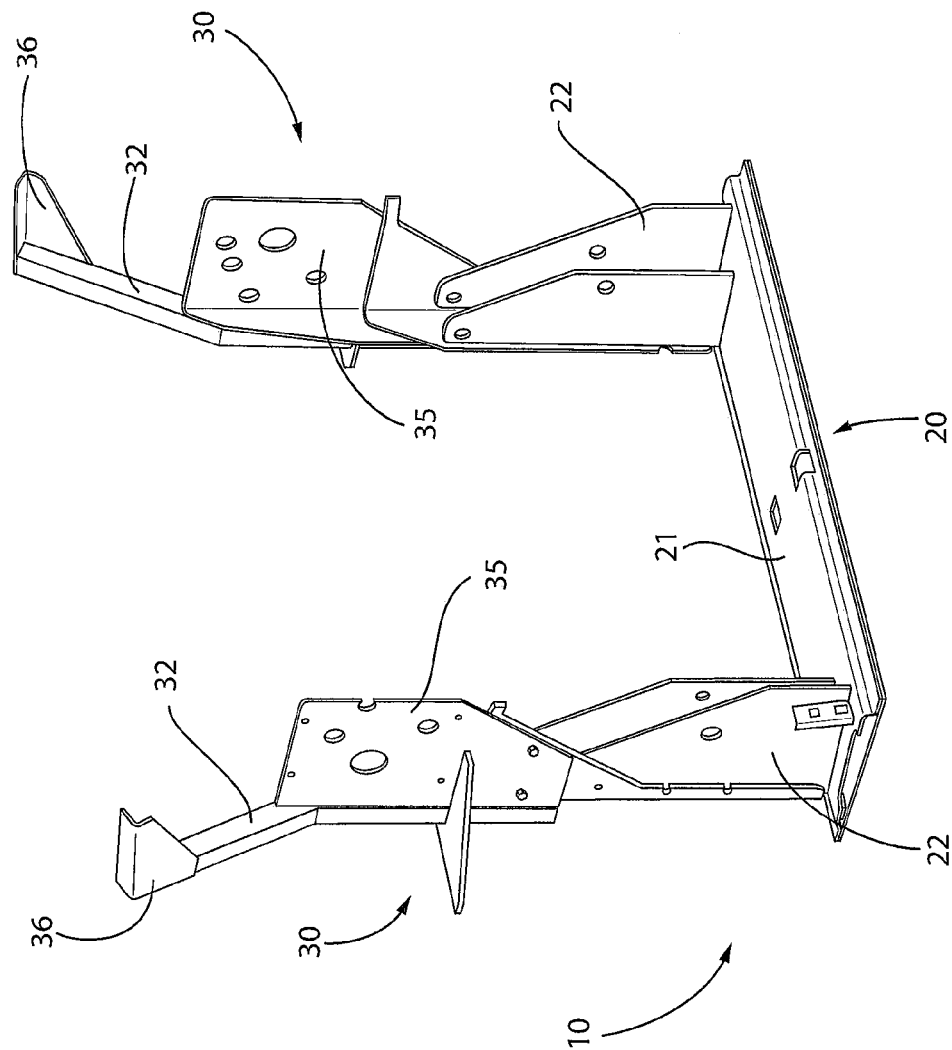
FIG. 7 depicts a perspective view of a wheelchair lift arrangement in accordance with another embodiment of the present invention.
Figure 8:
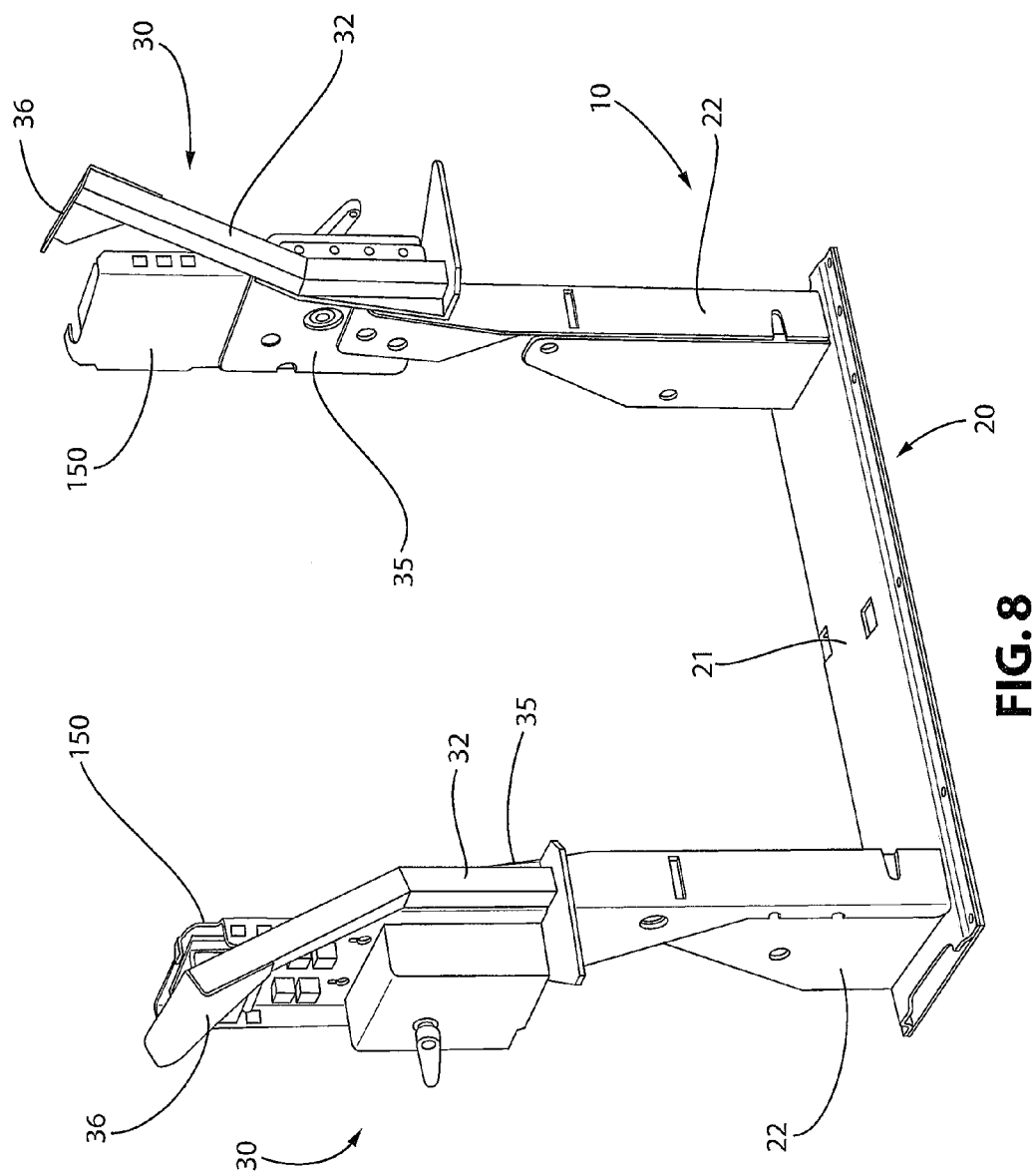
FIG. 8 depicts a perspective view of the wheelchair lift arrangement of FIG. 7 with a powered door operation system disposed thereon.

In particular, the horizontal portion 31 of the at least one installation bracket 30 may include a rod or bar extending from the vertical portion 32 and/or the corresponding vertically-extending support 22. The vertical portion 32 of the at least one installation bracket 30 may include a piece of square or cylindrical tubing attached to and extending from the vertically-extending support 22. The vertical portion 32 may include an angled plate(s) 36 disposed at an end thereof opposite to the vertically-extending support 22. The plates 36 may be channel-shaped structures, as shown in FIGS. 3, 4, and 6, or may have an L-shaped cross section, as shown in FIGS. 7 and 8. The vertical portion 32 may also include a handle member 37 attached thereto to allow for a user of the wheelchair lift arrangement 10 to push and pull himself/herself to and from the preexisting structure.

Further, the horizontal portion 31 of the at least one installation bracket 30 includes a connection arrangement 33, which may be in the form of a spherical rod, disposed at an end thereof opposite to the vertically-extending support 22. Likewise, the vertical portion 32 of the at least one installation bracket 30 also includes a connection arrangement 34, which may be in the form of a spherical rod, disposed at an end thereof opposite to the vertically-extending support 22. Each of the connection arrangements 33, 34 is configured to connect the horizontal portion 31 and the vertical portion 32, respectively, to the preexisting structure at the separate specified locations.

In particular, the connection arrangements 33, 34 connect the horizontal portion 31 and the vertical portion 32, respectively, to a respective one of preexisting anchorage points 102, 103 formed in the structure of the vehicle 100. For instance, as shown in FIGS. 4 and 6, the connection arrangement 33 of the horizontal portion 31 may connect to a preexisting fastener 102 that is provided in the vehicle 100 for attachment of a vehicle seat and the connection arrangement 34 of the vertical portion 32 may connect to an alternate restraint belt attachment point 103 of the vehicle 100. It is to be appreciated, however, that the connection arrangements 33, 34 may connect the horizontal portion 31 and the vertical portion 32, and, thus, the installation bracket 30 and the lift base assembly 20, to a variety of different preexisting structural strong points formed in the interior structure of the vehicle 100 during its manufacture.

In accordance with one embodiment of the present invention, some or all of the attachment points 102, 103 and associated arrangements 33, 34 are strengthened and/or structural points provided by the vehicle manufacturer for other reasons, such as the alternate seat and/or restraint anchorage points. Accordingly, in one preferred and non-limiting embodiment, the vehicle 100 can be fitted with the wheelchair lift arrangement 10 where no additional holes and/or modifications are required in the vehicle structure 100 in order to attach the wheelchair lift arrangement 10. Further, and in another preferred and non-limiting embodiment, the capacities and/or structural integrity of the vertical portion 32 and/or the horizontal portion 31 of the installation bracket 30 are such that one or both are capable of supporting the load imposed by the wheelchair lift arrangement 10, thereby providing a redundant support means and a safer application.

With reference to FIG. 5, the wheelchair lift arrangement 10 may further include an installation plate 40 that connects the lift base plate 21 of the lift base assembly 20 to the preexisting structure. In particular, the installation plate 40 connects the lift base plate 21 to the floor 101 of the vehicle 100. The installation plate 40 may be integral with the lift base plate 21 or may be connected to the lift base plate 21 at a number of positions or locations by connection elements 41, such as fasteners. The connection elements 41 used to connect the lift base plate 21 to the vehicle floor 101 are only used to affix the lift base assembly 20 to the installation plate 40. Accordingly, and because the majority of the load entering the structure of the vehicle 100 from the lift travels through the vertical portion 32 and the horizontal portion 31 of the installation brackets 30, the installation plate 40 is only required to bear a small amount of shear force between the vehicle floor 101 and the installation plate 40. Therefore, the strength requirements of the fastening mechanism used to connect the installation plate 40 to the vehicle floor 101 are considerably less than would be typical in the art. In another preferred and non-limiting embodiment, and as further illustrated in FIG. 5, a fastener utilized to at least partially connect the installation plate 40 to the vehicle floor is a preexisting cargo loop fastener 104, which may be provided by the vehicle manufacturer.

With reference to FIGS. 7 and 8, in accordance with a further preferred and non-limiting embodiment of the invention, each of the installation brackets 30 may further include an attachment member 35 disposed on the installation bracket 30. In particular, the attachment member 35 is attached to or formed integral with the vertical portion 32 of the installation bracket 30. However, the attachment member 35 could also be attached to or formed integrally with the horizontal portion 31 of the installation bracket 30. The attachment member 35 is configured to have a powered door operation system 150, shown in FIG. 8, mounted thereon. The powered door operation system 150 may be of any configuration known to those having ordinary skill in the art to be suitable for operating a rear door (not shown) disposed in the rear entry 105 to open and close.

In this manner, the present invention provides a modular installation method and arrangement for use in connection with attaching a wheelchair lift arrangement 10 to a vehicle 100. In one preferred and non-limiting embodiment, by combining and/or integrating various vehicle door operators 150 with the wheelchair lift installation brackets 30, the resulting modularized system can be installed in a vehicle 100 with no or very little modification to the vehicle 100, which results in a savings in both material and labor costs, as compared to existing installation systems.

As discussed, and in the continuous struggle by vehicle manufacturers to make vehicles lighter and more fuel efficient, vehicle structures are becoming less able to adequately support the loads imparted by an aftermarket device, such as a wheelchair lift arrangement. According to the present invention, by moving the attachment points 102, 103, 104 of the wheelchair lift arrangement 10 further apart, smaller loads occur at the mechanical interface points between the wheelchair lift arrangement 10 and the vehicle 100, which reduces the need for reinforcing structures, thereby saving weight and material cost. Further, by attaching and/or integrating the installation brackets 30 with the lift base plate 21, the overall wheelchair lift arrangement 10 is modularized, thus reducing the overall required installation and associated costs. Moreover, minimizing the required vehicle modification enables the leasing of vehicles to be equipped with a wheelchair lift arrangement 10, which was previously considered impossible.

Additionally, with reference to FIGS. 3-8, in accordance with an embodiment of the present invention, a method of installing a wheelchair lift arrangement 10 in a vehicle 100, which includes a vehicle floor 101 and at least one preexisting anchorage point 102, 103, includes the steps of: providing a lift base assembly 20 including a lift base plate 21 and at least two vertically-extending supports 22 attached to the lift base plate 21; providing at least one installation bracket 30 connected to the at least one vertically-extending supports 22, wherein the at least one installation bracket 30 includes at least one of a horizontal portion 31 and a vertical portion 32 having a connection arrangement 33, 34 disposed at an end thereof; connecting the lift base plate 21 to the vehicle floor 101; and connecting the connecting arrangement 33, 34 to the at least one preexisting anchorage point 102, 103. The step of connecting the lift base plate 21 to the vehicle floor 101 may include the steps of at least partially connecting an installation plate 40 to the vehicle floor 101 with a preexisting cargo loop fastener 104 of the vehicle 100; and mounting the lift base plate 21 on the installation plate 40. The preexisting anchorage point 102, 103 of the vehicle 100 may include an existing fastener 102 provided for attachment of a vehicle seat or an alternate restraint belt attachment point 103.

It is to be understood that the invention may assume various alternative variations and step sequences, except where expressly specified to the contrary. It is also to be understood that the specific devices and processes illustrated in the attached drawings, and described in the specification, are simply exemplary embodiments of the invention. Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope thereof. For example, it is to be understood that the present invention contemplates that, to the extent possible, one or more features of any embodiment can be combined with one or more features of any other embodiment.

The invention claimed is:

1. A wheelchair lift arrangement configured to be installed in a preexisting structure, comprising:
a lift base assembly including a lift base plate and at least two supports attached to the lift base plate, the at least two supports are configured to mount and support a parallel-arm lift mechanism, the at least two supports having a first side configured to face a rearward end of a vehicle and a second side configured to face a forward end of a vehicle; and
at least one installation bracket connected to at least one of the supports, wherein the at least one installation bracket comprises a horizontal portion and a vertical portion, the horizontal portion having a first end connected to at least one of the supports and a second end positioned opposite the first end of the horizontal portion, the horizontal portion extending away from the at least two supports in a direction extending from the first side to the second side of at least one of the supports, the second end of the horizontal portion having a connection arrangement configured to connect the horizontal portion to the preexisting structure at a first specified location, the vertical portion having a first end connected to at least one of the supports and a second end positioned opposite the first end of the vertical portion, the first end of the vertical portion extending from the second side of at least one of the supports, the second end of the vertical portion having a connection arrangement configured to connect the vertical portion to the preexisting structure at a second specified location, the first specified location spaced from the second specified location, the second end of the horizontal portion spaced from the vertical portion, the connection arrangements of the horizontal portion and the vertical portion each configured to be fixed relative to the preexisting structure.

2. The wheelchair lift arrangement according to claim 1, wherein the connection arrangements of the horizontal portion and the vertical portion each comprise a spherical rod end.

3. The wheelchair lift arrangement according to claim 1, wherein the at least one installation bracket comprises at least two installation brackets each connected to a respective one of the at least two supports and each including a horizontal portion and a vertical portion, each configured to connect the respective one of the at least two installation brackets to the preexisting structure at separate specified locations.

4. The wheelchair lift arrangement according to claim 1, further comprising an installation plate configured to connect the lift base plate to the preexisting structure.

5. The wheelchair lift arrangement according to claim 1, wherein the wheelchair lift arrangement is configured to be installed in a modular manner.

6. The wheelchair lift arrangement according to claim 1, wherein the at least one installation bracket includes an attachment member configured to have a powered door operation system mounted thereon.

7. A vehicle and wheelchair lift arrangement, wherein the vehicle includes a vehicle floor and first and second preexisting anchorage points, the wheelchair lift arrangement comprising:
a lift base assembly including a lift base plate and at least two supports attached to the lift base plate, the lift base plate being connected to the vehicle floor, the at least two supports are configured to mount and support a parallel-arm lift mechanism, the at least two supports having a first side configured to face a rearward end of the vehicle and a second side configured to face a forward end of the vehicle; and
at least one installation bracket connected to at least one of the supports, wherein the at least one installation bracket comprises a horizontal portion and a vertical portion, the horizontal portion having a first end connected to at least one of the supports and a second end positioned opposite the first end of the horizontal portion, the horizontal portion extending away from the at least two supports in a direction extending from the first side to the second side of at least one of the supports, the second end of the horizontal portion having a connection arrangement configured to connect the horizontal portion to the first preexisting anchorage point, the vertical portion having a first end connected to at least one of the supports and a second end positioned opposite the first end of the vertical portion, the first end of the vertical portion extending from the second side of at least one of the supports, the second end of the vertical portion having a connection arrangement configured to connect the vertical portion to the second preexisting anchorage point, the second end of the horizontal portion spaced from the vertical portion, the connection arrangements of the horizontal portion and the vertical portion each configured to be fixed relative to the preexisting structure.

8. The vehicle and wheelchair lift arrangement according to claim 7, wherein the connection arrangements of the horizontal portion and the vertical portion each comprise a spherical rod end.

9. The vehicle and wheelchair lift arrangement according to claim 7, wherein one of the first and second preexisting anchorage points comprise an existing fastener provided in the vehicle for attachment of a vehicle seat.

10. The vehicle and wheelchair lift arrangement according to claim 7, wherein one of the first and second preexisting anchorage points comprise an alternate restraint belt attachment point.

11. The vehicle and wheelchair lift arrangement according to claim 7, wherein one of the first and second preexisting anchorage points is a vehicle structural strong point.

12. The vehicle and wheelchair lift arrangement according to claim 7, further comprising an installation plate that connects the lift base plate to the vehicle floor.

13. The vehicle and wheelchair lift arrangement according to claim 12, wherein the installation plate is at least partially connected to the vehicle floor by a preexisting cargo loop fastener of the vehicle.

14. The vehicle and wheelchair lift arrangement according to claim 7, wherein the lift base assembly is mounted in the vehicle proximate to a rear entry of the vehicle.

15. The vehicle and wheelchair lift arrangement according to claim 14, wherein the at least one installation bracket includes an attachment member configured to have a powered vehicle door operation system mounted thereon for operating a rear door disposed in the rear entry.

16. The vehicle and wheelchair lift arrangement according to claim 7, wherein the wheelchair lift arrangement is configured to be installed in a modular manner.

17. The vehicle and wheelchair lift arrangement according to claim 7, wherein the at least one installation bracket comprises at least two installation brackets each connected to a respective one of the at least two supports and each including a horizontal portion and a vertical portion, each configured to connect the respective one of the at least two installation brackets to the vehicle at separate preexisting anchorage points.

* * * * *

UNITED STATES PATENT AND TRADEMARK OFFICE
CERTIFICATE OF CORRECTION

PATENT NO. : 9,943,454 B2
APPLICATION NO. : 14/384830
DATED : April 17, 2018
INVENTOR(S) : Stanton D. Saucier et al.

Page 1 of 1

It is certified that error appears in the above-identified patent and that said Letters Patent is hereby corrected as shown below:

Column 1, Line 12, delete "60/612,642," and insert -- 61/612,642, --

Signed and Sealed this
Twenty-sixth Day of June, 2018

Andrei Iancu
*Director of the United States Patent and Trademark Office*